United States Patent [19]
Cerveny

[11] 3,839,051
[45] Oct. 1, 1974

[54] REMOVABLE OR STRIPABLE ANTI CORROSIVE COATING COMPOSITION

[75] Inventor: Ladislav Cerveny, Praha, Czechoslovakia

[73] Assignee: Institut Manipulacnich, dopravnich, obalovych a skladovacich systemu, Praha, Czechoslovakia

[22] Filed: Apr. 26, 1972

[21] Appl. No.: 247,802

[52] U.S. Cl............ 106/14, 106/176, 106/186, 106/196, 117/6, 117/132 R, 252/390
[51] Int. Cl............................................ C09d 5/08
[58] Field of Search ............ 106/14, 196, 176, 186; 252/390, 394; 117/132 R, 6

[56] References Cited
UNITED STATES PATENTS
2,927,036  3/1960  Seaver .............................. 106/196

FOREIGN PATENTS OR APPLICATIONS
556,592     4/1958  Canada ............................... 106/14
1,121,124   7/1968  Great Britain ....................... 106/14

*Primary Examiner*—Lorenzo B. Hayes
*Attorney, Agent, or Firm*—Murray Schaffer

[57] ABSTRACT

Coating compositions particularly useful for protecting coated materials against atmospheric corrosion and comprising cellulose acetobutyrate, plasticizers therefor, corrosion inhibitor in the form of at least one adduct of chromic acid with carbonic acid imine diamide and organic solvent. The compositions are made by dissolving the corrosion inhibitor in organic solvent, adding the plasticizer to the solution and then bringing the solution into contact with cellulose acetobutyrate while agitating to form a homogeneous composition.

20 Claims, No Drawings

REMOVABLE OR STRIPABLE ANTI CORROSIVE COATING COMPOSITION

BACKGROUND OF THE INVENTION

This invention relates to coating compositions, a method for making the same and products protected therewith. More particularly, the invention relates to coating compositions or materials for protecting metal surfaces against atmospheric corrosion, a method for making the coating compositions and metal objects protected therewith.

Although the coating compositions of this invention are particularly suitable for protecting metal surfaces against atmospheric corrosion, it is to be understood that they may also be employed to protect both ferrous surfaces and other surfaces, such as surfaces of non-ferrous metal, wood, ceramics and the like, so long as the coating does not itself adversely affect the surfaces being coated therewith. However, in the interest of simplicity, the present invention is disclosed as it applies to the protection of metal surfaces against atmospheric corrosion. Moreover, while protection from atmospheric corrosion is the primary consideration underlying the invention, the coating compositions of the invention can also be used to protect surfaces against corrosion from other sources.

Coating compositions or materials suitable for protecting surfaces against atmospheric or other sources of corrosion should satisfy a number of requirements. For example, such materials should be easy to apply to the surfaces to be protected, readily removable therefrom, especially after prolonged periods of exposure to widely varying climatic conditions, and which at the same time exhibit protective properties which do not deteriorate in effectiveness during such exposure periods. These qualities are especially desirable, for example, in connection with large metal objects, such as ships and the like, where it is necessary to cover areas of large size that are generally stored over long periods of time in uncovered locations and which are usually made of steel, as well as various other structures which may be made of non-ferrous and/or light metal materials such as buildings or sheds often used for industrial purposes and the like.

Presently known coatings, however, either do not meet these requirements at all or meet them inadequately at most. Thus, for example, packages impregnated with corrosion inhibitors are generally not suitable for the storage of objects in the open. On the other hand, coating materials suitable for temporary protection which are applied in the form of a melt generally can be used only for small objects and corrosion inhibitors cannot be added to them. Furthermore, it has been found that the mere combination of the usual, known coating materials with known corrosion inhibitors as, for example, guanidine chromates, nitrites and the like do not result in the required increase in anti-corrosion effects. For example, when such compositions are exposed to atmospheric conditions, their anti-corrosion efficiency does not last long and they become more difficult to remove as time goes on. In addition, while the film-forming constituent as such may be resistant to prevailing climatic conditions when employed alone, such is not the case in the presence of corrosion inhibitors, some of which are not resistant to atmospheric influences when so combined, often, which not being adequately anchored in the film-forming constituent, are removed therefrom by climatic influences with loss of protective effect. On the other hand, the corrosion inhibitors may be so firmly built into the film-forming constituent that the inhibiting ions do not possess the necessary mobility to offer the required degree of protection.

It is seen, therefore, that the variety of demands placed on removable coating materials presents a complicated problem which has not been successfully solved up to this time. There exists, therefore, a need for coating compositions which contain corrosion inhibitors and which do not exhibit the above mentioned disadvantages but which at the same time possess the necessary properties set forth hereinabove. The present invention provides such materials.

SUMMARY OF THE INVENTION

In accordance with the invention, there is provided coating compositions comprising (1) a major proportion of cellulose acetobutyrate, (2) a minor proportion of a plasticizer therefor, (3) a minor proportion of corrosion inhibitor in the form of at least one adduct of chromic acid with carbonic acid imine diamide as defined in the formulae hereinafter set forth and organic solvent. The method for making such coating compositions generally comprises dissolving the corrosion inhibitor in an organic solvent therefor, adding a cellulose acetobutyrate plasticizer to the solution, then bringing the solution so formed into contact with cellulose acetobutyrate and agitating the mixture until a homogeneous composition is obtained.

DESCRIPTION OF THE PREFERRED EMBODIMENTS

In carrying out the practice of this invention, the cellulose acetobutyrate is generally employed as the major constituent in an amount of from about 10 to about 60 parts by weight, the plasticizer therefor, in an amount of from about 2 to about 20 parts by weight, the corrosion inhibitor in an amount of from about 0.1 to about 3 parts by weight and the remainder being sufficient solvent to make the total equal 100 parts, all amounts being based on the total weight of the composition. Moreover, it is to be understood that although the above ranges are not critical, best results are obtained by maintaining the amounts of the constituents employed within the ranges set forth. In this connection, the amount of plasticizer and corrosion inhibitor can be increased as the amount of cellulose acetobutyrate is increased and the amount of solvent can be increased so long as the relationship of the other constituents does not fall appreciably below the lower end of the recited amounts in relation to the total with the solvent amount being sufficient to result in a mixture, solution or dispersion which is suitable for application to an object by brushing, dipping or spraying and the like.

The chromic acid - carbonic acid imine diamides which can be used in the compositions of this invention include those having the general formulae:

(I)
$$\left[ \begin{array}{c} \diagup N \diagdown_{R_1} \\ C=NH \diagdown_{R_2} \\ \diagdown NH_2 \end{array} \right]_2 H_2CrO_4$$

(II) 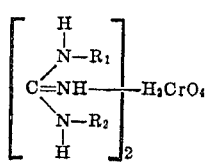

wherein $R_1$ is an organic radical selected from the group consisting of alkyl radicals containing 1 to 5 carbon atoms, cyclohexyl radicals, phenyl radicals and alkylphenyl radicals containing 1 to 2 carbon atoms in the alkyl group and $R_2$ is selected from the groups consisting of the same radicals as $R_1$ and hydrogen. Such materials include the adducts of chromic acid with dimethylguanidine, propylguanidine, dibenzylguanidine, cyclohexylguanidine, diphenylguanidine and the like.

Examples of suitable plasticizers for cellulose acetobutyrate which can be employed in the practice of this invention include phthalic acid esters, such as dibutyl phthalate, and the like, triaryl phosphates and blown castor oil and the like.

The organic solvents which are employed in the practice of this invention are generally organic polar solvents, such as the lower alcohols, ketones, esters of the lower fatty acids, such as acetic acid, esters and the like and glycol ethers. The amounts of the solvents and their combination are chosen in accordance with the kind of application in which the coating material is to be utilized.

Furthermore, the coating materials may be further supplemented by small additions of other constituents which modify the application properties thereof. Such additional materials include thixotropic agents, such as silicic acid that has a high dispersion coefficient and agents to improve the spreadability of the materials, such as glycolaethers and glycolesters or their mixtures and the like.

The coating compositions of this invention are made by substantially completely dissolving the corrosion inhibitor in organic polar solvent at ambient temperature, adding cellulose acetobutyrate plasticizer to the solution and then bringing the solution so prepared into contact with cellulose acetobutyrate and agitating the mixture until a substantially homogeneous composition is formed. Although the preparation is preferably carried out at ambient temperature, that is, generally room temperature of about 20°C, it may be achieved at a temperature in a range from the freezing temperature of the solution being made to the first decomposition temperature of the final solution, that is, in a range of from about −5°C to about +30°C. Preparation of the composition in the manner set forth results in the formation of a stable material which can be stored in an unused state over long periods (up to about 2 years).

In accordance with the invention, a metal surface such as steel, zinc, aluminum, brass, nickel, stamun, lead chrome and the alloys of these metals, can be protected against atmospheric corrosion by brushing or spraying the coating composition or material on to the surface at temperatures in a range from the freezing point of the material up to the decomposition temperature and preferably from about ambient temperature about 20°C up to about 30°C. On the other hand, the surface to be protected may also be dipped into the coating composition. Moreover, due to its facility of handling, the material can be easily applied to large objects such as machines, industrial installations, and various parts thereof. In addition, the coating material is effective against corrosion and damage over long periods of time while still being easily removable even after prolonged exposure to atmospheric conditions.

The improved protection resulting from the coating compositions of this invention when they are applied to objects to be protected is attained by relatively thin coatings of the film. In this connection, although the thickness of a film of coating material applied to an object may vary widely, it is beneficial to employ as thin a coating as possible in the interest of economy while at the same time achieving the desired protection. The improved protection achieved by the coating compositions of this invention is illustrated in the following table which shows the results obtained on steel samples coated to a thickness of about 150 microns and exposed in the open to the atmosphere for a period of 16 months in comparison with control samples without any protective coating and with a coating material containing no corrosion inhibitor. The table shows the corrosion losses in grams per square meter utilizing 0.6 per cent or 0.6 part per hundred of composition of inhibitor.

| INHIBITOR AND CONCENTRATION | CORROSION LOSS g/m² |
| --- | --- |
| 0.6% symm. dimethylguanidine chromate | less than 1.0 |
| 0.6% asymm. dimethylguanidine chromate | 0.8 |
| 0.6% propylguanidine chromate | 0.5 |
| 0.6% cyclohexylguanidine chromate | less than 1.0 |
| 0.6% dibenzylguanidine chromate | less than 0.5 |
| 0.6% diphenylguanidine chromate | 4.8 |
| Coating without inhibitor | 22.3 |
| Sample without protective coating | 430.0 |

THE EXAMPLES

In order to illustrate the invention the following illustrative examples are set forth. It is to be understood that the examples are illustrative only and not limitative. In the examples all parts and percents are by weight unless otherwise stated.

EXAMPLE 1

9 grams of dimethylguanidine chromate was dissolved in 300 grams of a mixture containing equal parts of ethyl alcohol and acetone. 35 grams of dibutyphthalate was added and the solution was, after homogenization, brought into contact with 291 grams of cellulose acetobutyrate. After final homogenization, the coating material obtained was suitable for application by brushing, dipping and spraying.

EXAMPLE 2

A coating material was prepared in a manner analogous to that described in Example 1, but it consisted of 3.5 grams of propylguanidine chromate, 460 grams of solvents, 25 grams of blown castor oil and 340 grams of cellulose acetobutyrate. The coating material was suitable for application by brushing, spraying or coating.

EXAMPLE 3

A coating material was prepared in a manner analogous to that described in Example 1, but it consisted of 1.7 grams of dibenzylguanidine chromate, 650 grams of solvents, equal parts of acetone and ethyl alcohol being used as well as 40 grams of tricresyl phosphate and 350 grams of cellulose acetobutyrate. The coating material was suitable for application by brushing, dipping or spraying.

EXAMPLE 4

A coating material was prepared in a manner analogous to that described in Example 1, but it consisted of 1.5 grams of cyclohexylguanidine chromate, 670 grams of solvent mixture, 20 grams of plasticizer, 200 grams of cellulose acetobutyrate and 50 grams of silicic acid that has a high dispersion coefficient as a thixotropic agent. The coating material was suitable for application by brushing, dipping or spraying.

Numerous variations of the embodiments of this invention may be made without departing from the spirit and scope of the invention. It is to be understood, therefore, that this invention is not to be limited except as defined in the appended claims.

What is claimed is:

1. A coating composition for metal objects comprising (1) 10-60 parts by weight of cellulose acetobutyrate, (2) 2-20 parts by weight of plasticizer therefor, (3) 0.1-3 parts by weight of corrosion inhibitor in the form of at least one adduct of chromic acid with carbonic acid imine diamide having the general formulae:

(I) 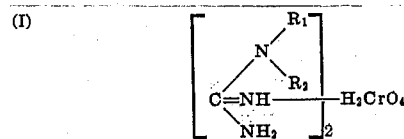

and (II) 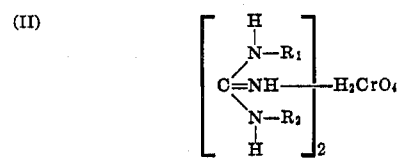

wherein $R_1$ is an organic radical selected from the group consisting of alkyl radicals containing 1 to 5 carbon atoms, cyclohexyl radicals, phenyl radicals and alkylphenyl radicals containing 1 to 2 carbon atoms in the alkyl group and $R_2$ is selected from the group consisting of the same radicals as $R_1$ and hydrogen, and (4) organic solvent, said coating composition being readily removable from the surface of metal objects to which it is applied.

2. A coating composition as defined in claim 1 wherein the corrosion inhibitor is dimethylguanidine chromate.

3. A coating composition as defined in claim 1 wherein the corrosion inhibitor is propylguanidine chromate.

4. A coating composition as defined in claim 1 wherein the corrosion inhibitor is cyclohexylguanidine chromate.

5. A coating composition as defined in claim 1 wherein the corrosion inhibitor is dibenzylguanidine chromate.

6. A coating composition as defined in claim 1 wherein the corrosion inhibitor is diphenylguanidine chromate.

7. A coating composition as defined in claim 1 wherein the organic solvent is a polar solvent.

8. A coating composition as defined in claim 1 including a minor proportion of a thixotropic agent admixed therewith.

9. A coating composition as defined in claim 1 wherein the plasticizer is an ester of phthalic acid.

10. A coating composition as defined in claim 9 wherein the plasticizer is dibutyl phthalate.

11. A coating composition as defined in claim 1 wherein the plasticizer is blown castor oil.

12. A method for making a coating composition for metal objects comprising dissolving 0.1 to 3 parts by weight of corrosion inhibitor in the form of at least one adduct of chromic acid with carbonic acid imine diamide having the general formulae:

(I) 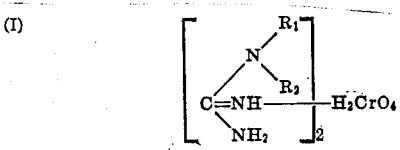

and (II) 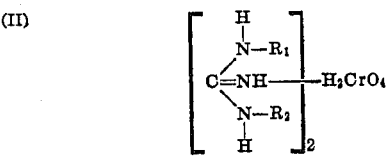

wherein $R_1$ is an organic radical selected from the group consisting of alkyl radicals containing 1 to 5 carbon atoms, cyclohexyl radicals, phenyl radicals and alkyl phenyl radicals containing 1 to 2 carbon atoms in the alkyl group and $R_2$ is selected from the group consisting of the same radicals as $R_1$ and hydrogen in an organic solvent, adding 2 to 20 parts by weight of a plasticizer to the solution and contacting said solution with 10 to 60 parts by weight of cellulose acetobutyrate while agitating the mixture until a homogeneous coating composition which is readily removable from the surfaces of metal objects to which it is applied is formed.

13. A method of temporarily protecting a metal object against atmospheric corrosion comprising contacting said object with a coating composition comprising (1) 10 to 60 parts by weight of cellulose acetobutyrate, (2) 2 to 20 parts by weight of plasticizer therefor, (3)

0.1 to 3 parts by weight of corrosion inhibitor in the form of at least one adduct of chromic acid with carbonic acid imine diamide having the general formulae:

(I) 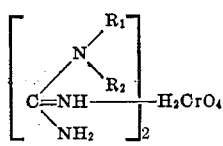

and (II) 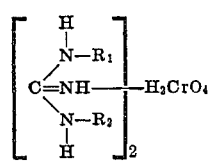

wherein $R_1$ is an organic radical selected from the group consisting of alkyl radicals containing 1 to 5 carbon atoms, cyclohexyl radicals, phenyl radicals and alkylphenyl radicals containing 1 to 2 carbon atoms in the alkyl group and $R_2$ is selected from the group consisting of the same radicals as $R_1$ and hydrogen and (4) organic solvent, said coating composition being readily removable from the surface of said metal object and applying a coating of said composition to said object to protect the object from corrosion by the atmosphere during prolonged storage in the open.

14. A method as defined in claim 13 wherein the object is sprayed with the coating composition.

15. A method as defined in claim 13 wherein the object is dipped into the coating composition.

16. A method as defined in claim 13 wherein the coating composition is brushed on the object.

17. A method as defined in claim 13, wherein the object is an object comprising a material selected from the group consisting of steel, copper, zinc, aluminum, brass, nickel, tin, lead, chromium and alloys of these materials.

18. An article temporarily protected against atmospheric corrosion comprising a metal object having a coating thereon, said coating comprising (1) 10 to 60 parts by weight of cellulose acetobutyrate (2) 2 to 20 parts by weight of plasticizer therefor, (3) 0.1 to 3 parts by weight of corrosion inhibitor in the form of at least one adduct of chronic acid with carbonic acid imine diamide having the general formulae:

(I) 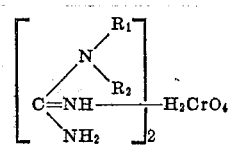

and (II) 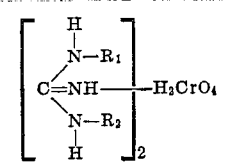

wherein $R_1$ is an organic radical selected from the group consisting of alkyl radicals containing 1 to 5 carbon atoms, cyclohexyl radicals, phenyl radicals and alkylphenyl radicals containing 1 to 2 carbon atoms in the alkyl group and $R_2$ is selected from the group consisting of the same radicals as $R_1$ and hydrogen, and (4) organic solvent, said coating being readily removable from the surface of said metal object to which it has been applied.

19. An article as defined in claim 18 wherein object is metal.

20. An article as defined in claim 19, wherein the object is an object comprising a material selected from the group consisting of steel, copper, zinc, aluminum, brass, nickel, tin, lead, chromium and alloys of these materials.

* * * * *